United States Patent [19]

Williams

[11] 4,384,618
[45] May 24, 1983

[54] AUTOMATICALLY RETRACTING TILLER FOR MOUNTING ON ONE SIDE OF A TRACTOR

[76] Inventor: Abbott R. Williams, 1195 Cuttings Wharf Rd., Napa, Calif. 94558

[21] Appl. No.: 281,419

[22] Filed: Jul. 8, 1981

[51] Int. Cl.³ .............................................. A01B 13/06
[52] U.S. Cl. ............................................. 172/5; 172/38
[58] Field of Search ............... 172/5, 6, 38, 233, 234, 172/235; 171/8; 56/10.4

[56] References Cited

U.S. PATENT DOCUMENTS

| | | | |
|---|---|---|---|
| 3,059,704 | 10/1962 | Kasatkin | 172/38 |
| 3,117,632 | 1/1964 | Caggiano, Jr. | 172/5 |
| 3,183,976 | 5/1965 | Rollins | 171/8 |
| 4,031,962 | 6/1977 | Ellinger | 171/8 |
| 4,183,195 | 1/1980 | James | 56/10.4 X |
| 4,206,580 | 6/1980 | Truax et al. | 56/10.4 |

FOREIGN PATENT DOCUMENTS 190682  2/1967  U.S.S.R. ............................. 172/5

*Primary Examiner*—Richard T. Stouffer
*Attorney, Agent, or Firm*—Owen, Wickersham & Erickson

[57] ABSTRACT

An automatically retracting tiller for installation at one or both sides of a tractor. A stationary frame is adapted to be secured to a side frame attachment of the tractor. A gimbal frame is pivoted to the stationary frame by a stationary horizontal pivot rod and carries first and second vertical pivot rods. A double-acting vertical hydraulic apparatus has a cylinder secured to the stationary frame and a piston rod secured to the gimbal frame, for tilting the gimbal frame about the horizontal pivot rod. A tiller frame is pivoted to the first vertical pivot rod and carries the tilling apparatus. A double-acting horizontal hydraulic apparatus has a cylinder secured to the stationary frame and a piston rod secured to the tiller frame for swinging the tiller frame about the first vertical pivot bar. A control valve for the horizontal hydraulic apparatus is mounted on the tiller frame and has a control lever. A cam is mounted on the second vertical pivot rod in contact with the control lever for operation of the valve. A spring-released sensor arm is connected to the second vertical pivot rod and extends out horizontally from the gimbal frame so that when it engages a vine or tree trunk or post or grapestake, it rotates the cam and actuates the valve to cause the horizontal hydraulic apparatus to retract the tiller frame and thereby protect the vine trunk from the tilling apparatus. The head is mounted for rotation normally in a horizontal plane and has five depending tines, set at 3° off vertical. A hydraulic motor rotates the tiller head at a speed of about 150–300 r.p.m.

21 Claims, 11 Drawing Figures

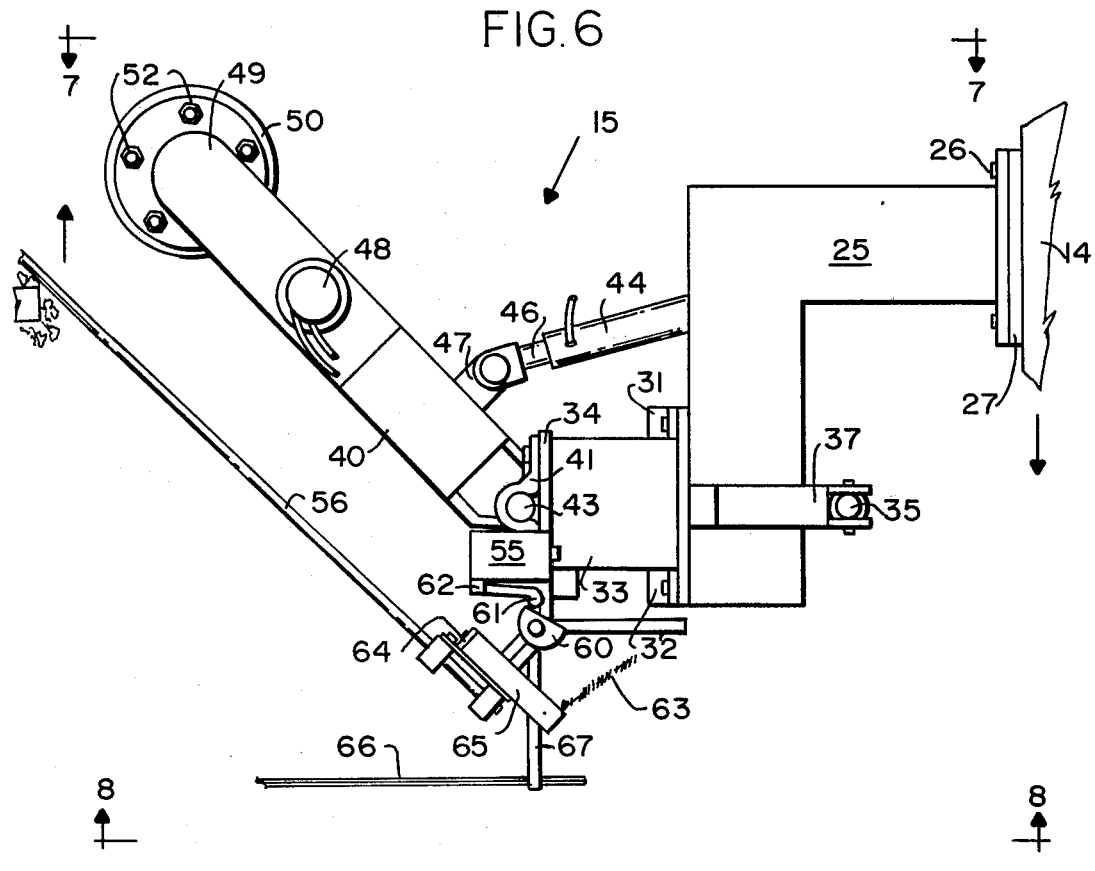
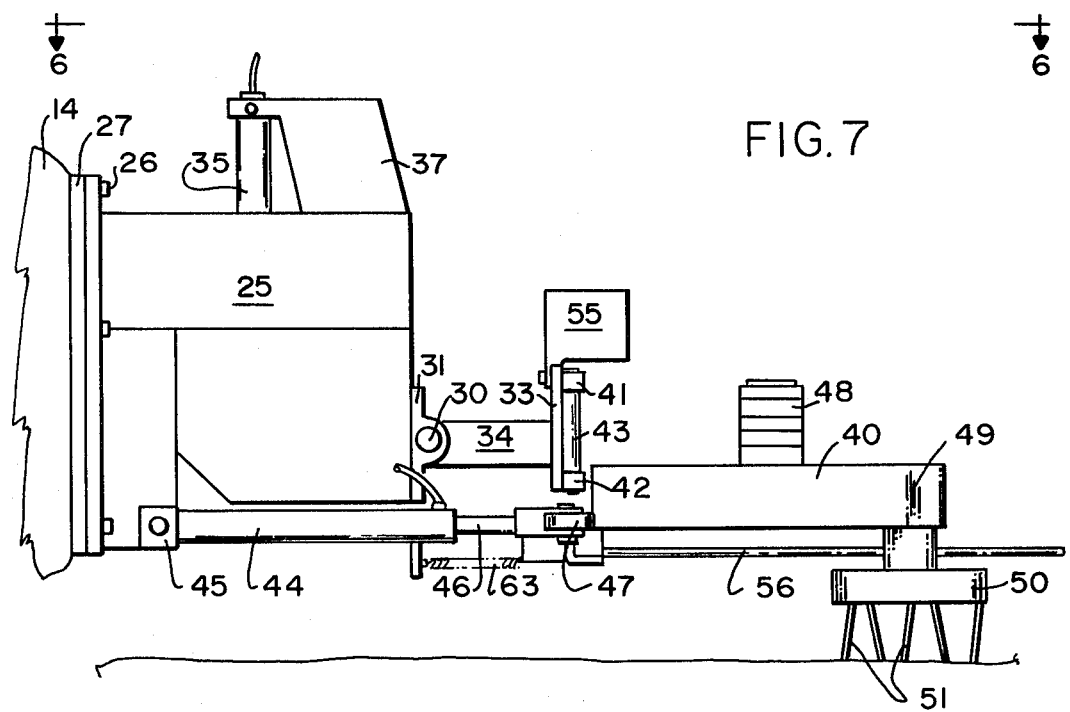

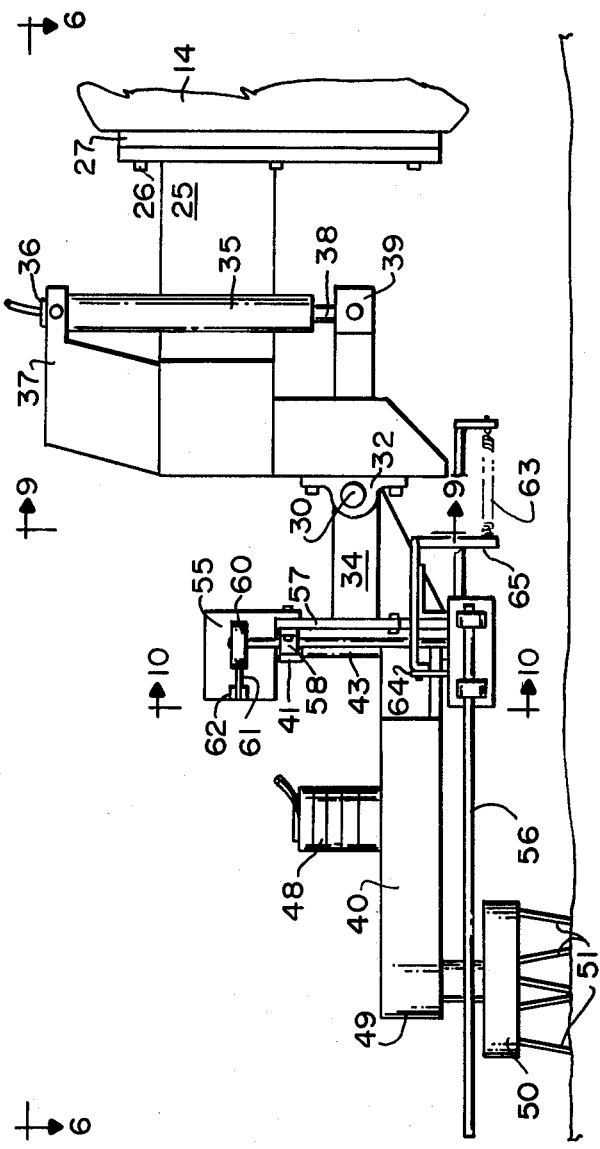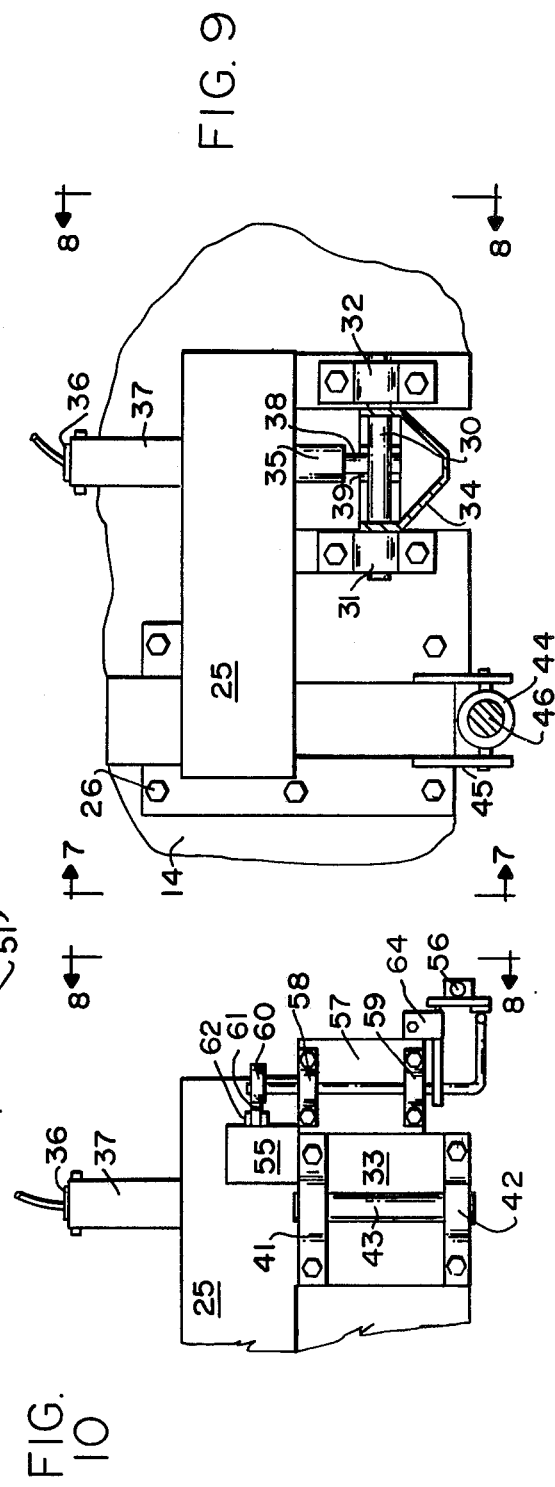

AUTOMATICALLY RETRACTING TILLER FOR MOUNTING ON ONE SIDE OF A TRACTOR

BACKGROUND OF THE INVENTION

The operation of plowing or tilling the land is relatively simple when the land has no crop, as where tilling is done before the planting of the seeds of an annual crop. However, when dealing with perennials or long-lived crops, such as vine and orchard crops, the tilling must be done in such a manner as not to uproot the vine or tree or damage the roots of the vine or tree.

Heretofore, the tilling has either been done by hand, which is arduous, or by the use of a so-called French plow, which can be retracted automatically. However, the tractor driver has to turn around constantly from looking ahead to looking behind in order to steer the tractor properly while maintaining the proper lateral distance from the vines. It is not at all rare for the operator when plowing a substantial area to uproot a few vines or trees, and thereby to counteract much of the value of the tilling operation. Plowing is also difficult along a fence because of the fence posts of a wire fence.

Various devices have been tried in an attempt to replace the French plow with something better, but up to now no such device has been sufficiently successful to gain general recognition. The devices have not prevented the undesirable uprooting, have not been sufficiently trustworthy or automatic, and have not accomplished the end desired.

It is therefore an object of the present invention to provide a tiller that can be used in vineyards and orchards and similar environments for accomplishing the desired tilling without damage to the crop being tilled.

Another object of the invention is to provide an automatically retractable tiller which does not require any manual action by the tractor operator in order to prevent damage to the vines, or trees, or other crop being tilled.

Another object of the invention is to provide a tiller which can easily be mounted on the side of the tractors now in use, practically all of which have brackets ready to accept side mounted attachments.

SUMMARY OF THE INVENTION

The invention comprises an automatically retractable tiller for installation at one or both sides of a tractor. The tiller has a stationary frame adapted to be secured to the frame of the tractor. This frame supports a gimbal having a gimbal frame pivoted to the stationary frame by a stationary horizontal pivot bar; the gimbal also has first and second vertical pivot bars or rods.

A double-acting vertical hydraulic apparatus has its cylinder secured to the stationary frame and a piston rod secured to the gimbal frame, so that it can tilt the gimbal frame about the horizontal pivot bar. A tiller frame is pivoted to the first vertical pivot bar and carries the tilling apparatus, so that a double-acting horizontal hydraulic apparatus having a cylinder secured to the stationary frame and a piston rod secured to the tiller frame can swing the tiller frame about the first vertical pivot bar.

A control valve for the horizontal hydraulic apparatus is mounted on the tiller frame and has a control lever. A sensor arm is connected to or is part of the second vertical pivot bar and extends out horizontally from the gimbal frame. It carries a cam in contact with the control lever, so that when the sensor arm engages a vine trunk, tree trunk, grapestake, fence post or the like it rotates the cam and actuates the valve to retract the tiller frame and thereby protect the vine trunk.

BRIEF DESCRIPTION OF THE DRAWINGS

FIG. 6 is a view like FIG. 4 with the tiller shown in retracted position. It is taken along the line 6—6 in FIG. 8.

FIG. 7 is a view in rear elevation of the tiller as shown in FIG. 6, as viewed along the line 7—7 in FIGS. 6 and 9.

FIG. 8 is a view in front elevation of the tiller of FIG. 6, as viewed along the lines 8—8 in FIGS. 6, 8, and 10.

FIG. 9 is a fragmentary view, partly in section taken along the line 9—9 in FIG. 8.

FIG. 10 is a fragmentary view taken along the line 10—10 in FIG. 8.

DESCRIPTION OF A PREFERRED EMBODIMENT

Figure 1:
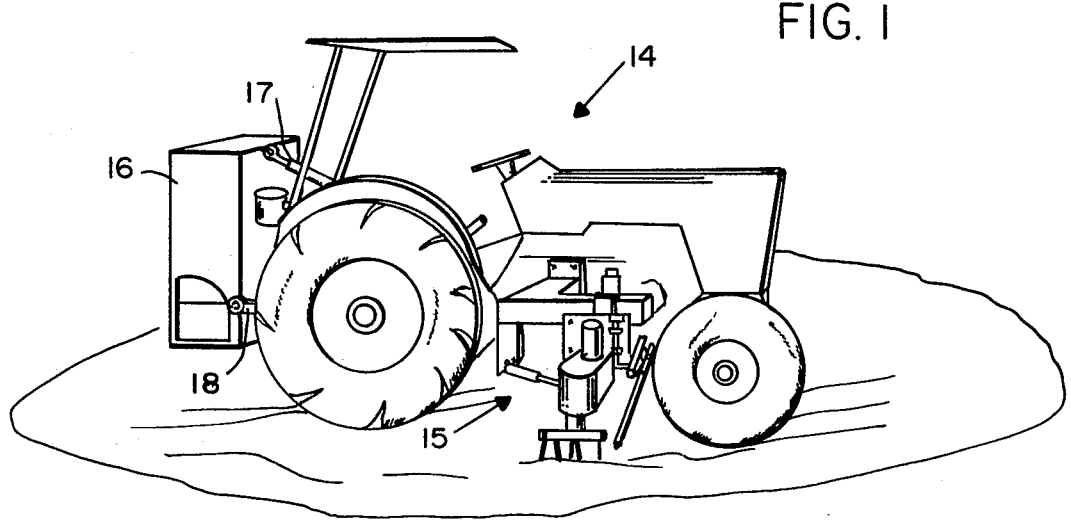
FIG. 1 is a side view in perspective of a tractor having a side-mounted tiller embodying the principles of the invention.
Figure 2:
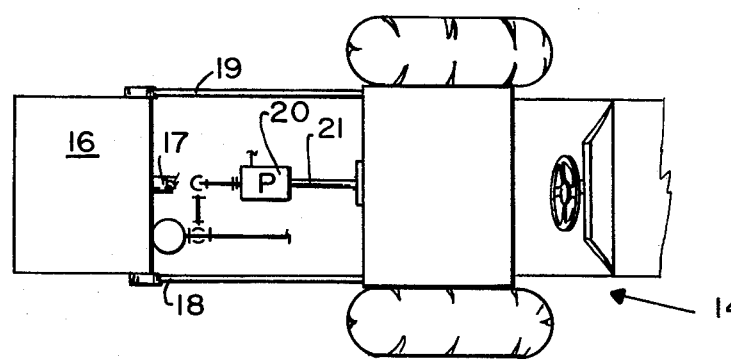
FIG. 2 is a top plan fragmentary view of the rear end of the tractor showing the large reservoir for hydraulic fluid and the supplemental hydraulic pump used therewith.
Figure 3:
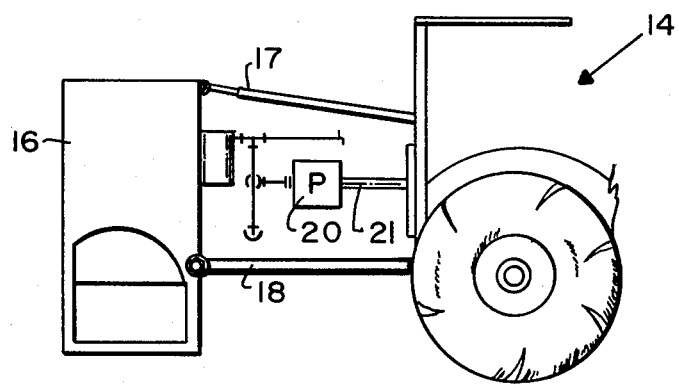
FIG. 3 is a fragmentary view in side elevation of the apparatus shown in FIG. 2.
Figure 4:
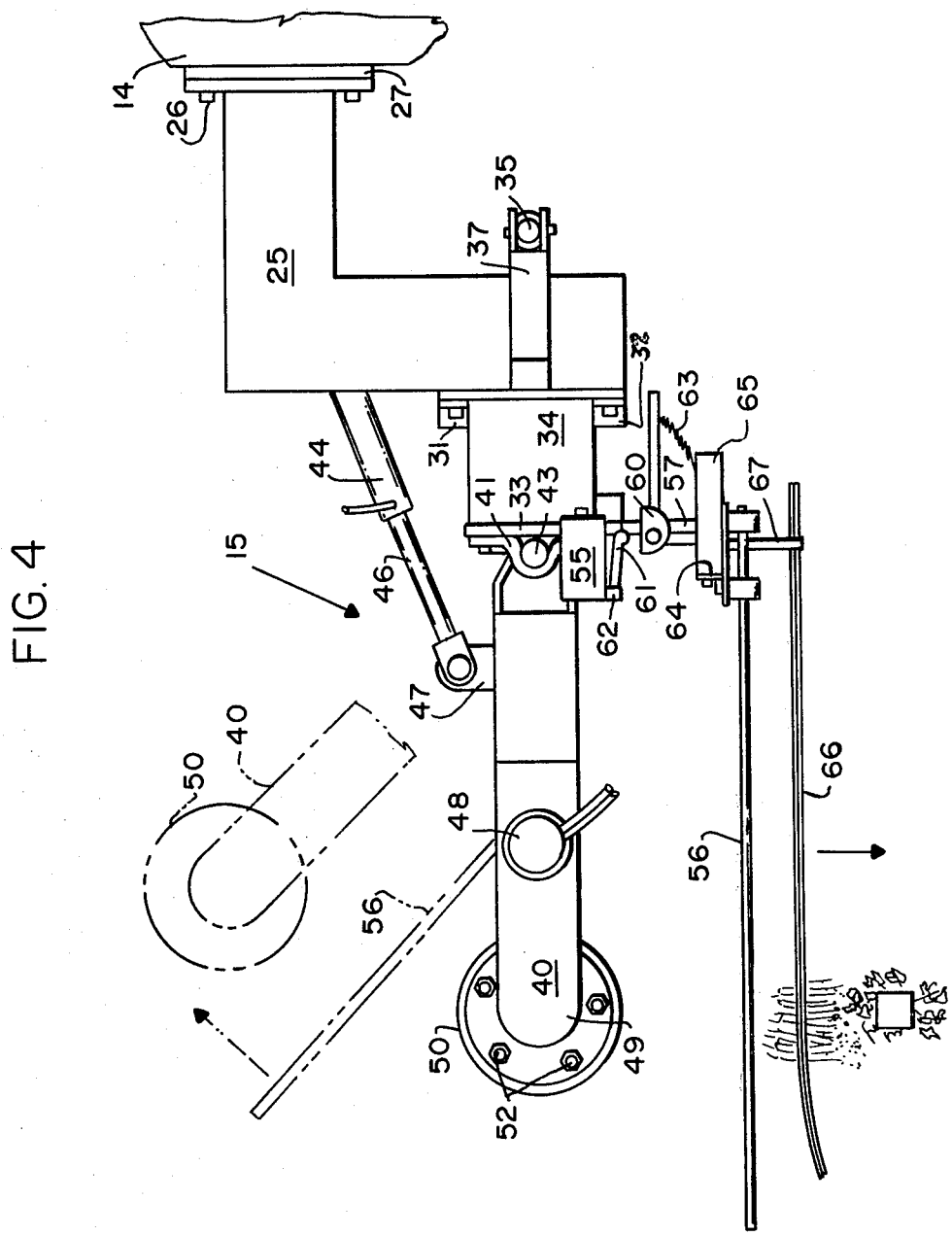
FIG. 4 is an enlarged top plan view of the tiller of FIG. 1 and of its attachment to one side of the tractor, the view being broken off there. The tiller is shown in solid lines in its normal operating position; broken lines show the retracted position of certain parts.
Figure 5:
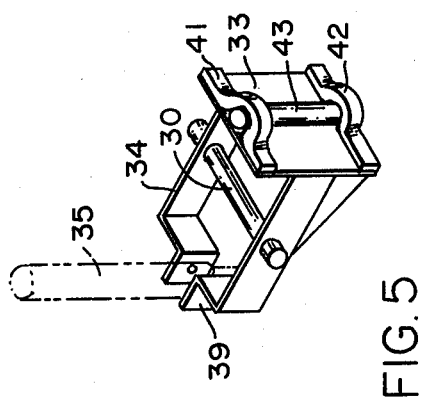
FIG. 5 is an isometric view of the gimbal for the tiller, the vertical hydraulic device being indicated in broken lines.

FIG. 1 shows a tractor 14 to one side of which is secured a tiller 15 embodying the principles of this invention. A large reservoir 16 for hydraulic fluid is supported at the rear of the tractor 14 by three-hitch points 17, 18, and 19 (see FIGS. 2 and 3). Connected to the reservoir 16 is a hydraulic pump 20 connected to and driven by a power take-off shaft 21 of the tractor 14. The pump 20 supplements the standard tractor pump and feeds a hydraulic motor and other hydraulic apparatus, as will be explained. The reservoir 16 and the pump 20 are needed because of the large flow of fluid required by the invention. The reservoir 16 can be relatively small for a closed-end pump operated only on demand.

FIGS. 4 through 10 show the tiller 15 in more detail. A stationary frame 25 is secured, preferably by bolts 26 so that it is removable, to a side frame bracket 27 of the standard farm tractor 14. The frame member 25 supports a horizontal pivot rod 30 by means of a pair of bearings 31 and 32. The pivot rod 30 supports or is part of a gimbal (see FIG. 5) having a frame 33 and including a pivotally mounted support member 34 that carries the gimbal frame 33. A vertically mounted double-acting hydraulic cylinder 35 is secured at its upper end 36 to an upwardly extending arm 37 of the stationary frame member 25, and a piston rod 38 extends out from the cylinder 35 and is secured to an end portion 39 of the support member 34 on the inboard side of the pivot rod 30. Thus, downward motion of the piston rod 38 swings the support member 34 about the pivot rod 30 and acts to lift an outboard tiller frame 40. Retraction of the piston rod 38 restores the frame 40 toward or to the horizontal position shown in FIGS. 7 and 8.

The support member 34 also carries bearings 41 and 42 that support a vertical pivot rod 43 to which the tiller frame 40 is pivoted, enabling swinging movement of the tiller frame 40 in a direction normal to the vertical pivot rod 43. This latter swinging movement is brought about by a horizontally mounted double-acting hydraulic cylinder 44, one end 45 of which is secured to the stationary frame member 25. Its piston rod 46 is pivotally mounted to a bracket 47 on the tiller frame 40. Extension of the rod 46 moves the tiller frame 40 outwardly to its FIG. 4 position, while retraction of the rod 46 pulls in the tiller frame 40 to its FIG. 6 position.

The tiller frame 40 extends outwardly and supports a hydraulic tiller motor 48 near its outboard end 49. The motor 48 may act through conventional gearing (not shown), or may be flat and directly overlie and be connected to a direct vertical shaft, to rotate a tiller head 50 having at least five downwardly extending tines 51, each preferably about nine inches long, each of which extends at an angle of 3° off normal in the direction so that it slightly trails rotation. Fewer than five tines 51 results in inability to remove substantially all of the weds encountered by the head 50. This helps to keep the tines free from weeds and cuttings even under severe conditions. It can be rotated in either direction, and the teeth or tines 51 are changed to trail, whichever direction is chosen. To make this change, nuts 52 are loosened and the tines 51 are each raised 180° and put down again. Ears on the tines engage slots in the head to insure the exact positioning. Typically, the motor 48 delivers about 25 horsepower to the head 50 and rotates it at about 150–300 r.p.m. The head 50 preferably tills a swath about fifteen to thirty inches wide, depending on the application, to a depth of up to about seven inches typically. The depth of the cut can be controlled by the operator at all times by means of the vertical cylinder 35, by which he can lift the tiller completely out of the ground and up in the air. The operator has full view of the head 50 at all times and the cutting depth may be made positive or may be made to float, as desired.

The tiller head 50 is automatically retracted by a valve 55 which is actuated by a sensor arm 56 and which then actuates the horizontal cylinder 44. The sensor arm 56 is pivoted to the gimbal frame 33 but not to the tiller frame 40. The sensor arm 56 normally extends out horizontally somewhat beyond the tiller head 50, and an inboard vertical portion or extension 57 is pivoted in a rubber grommet in pillow blocks 58 and 59 that are secured to the gimbal frame 33. The sensor arm 56 may be made from fiberglass. At the upper end of the portion 57 is mounted a specially shaped cam 60 (see FIG. 4) which, when the sensor arm 56 strikes a vine, tree trunk, grapestake, or fence post or the like, swings and comes against a valve-actuating arm 61 and thereby actuates a valve rod 62 of the valve 55 which controls the horizontal cylinder 44, causing it to retract and pull the tiller head 50 in toward the tractor 14. The cam action assures retraction of a set degree, unaffected by how much the sensor arm 56 swings, and the valve 55 automatically reverses, so that the tiller frame 40 is extended again when the sensor arm 56 is restored to its normal position by a spring 63. A resilient rubber strip 64 is mounted on a rigid metal support 65 and serves as a bumper stop to cushion the rapid return of the sensor arm 56. The cutting head 50 thus moves in and out of the plant row and does so automatically, retracting only so far as is pre-set by the valve 55 and cam 60.

Under extremely weedy conditions, a spring arm 66 may be mounted on a frame member 67 secured to the gimbal frame 33 parallel to the normal position of the sensor arm 56 but not moving with it. The non-retractable arm 66 is a springy weed suppressor and prevents unintentional actuation of the sensor arm 55 by large weeds, fending them away.

Figure 11:
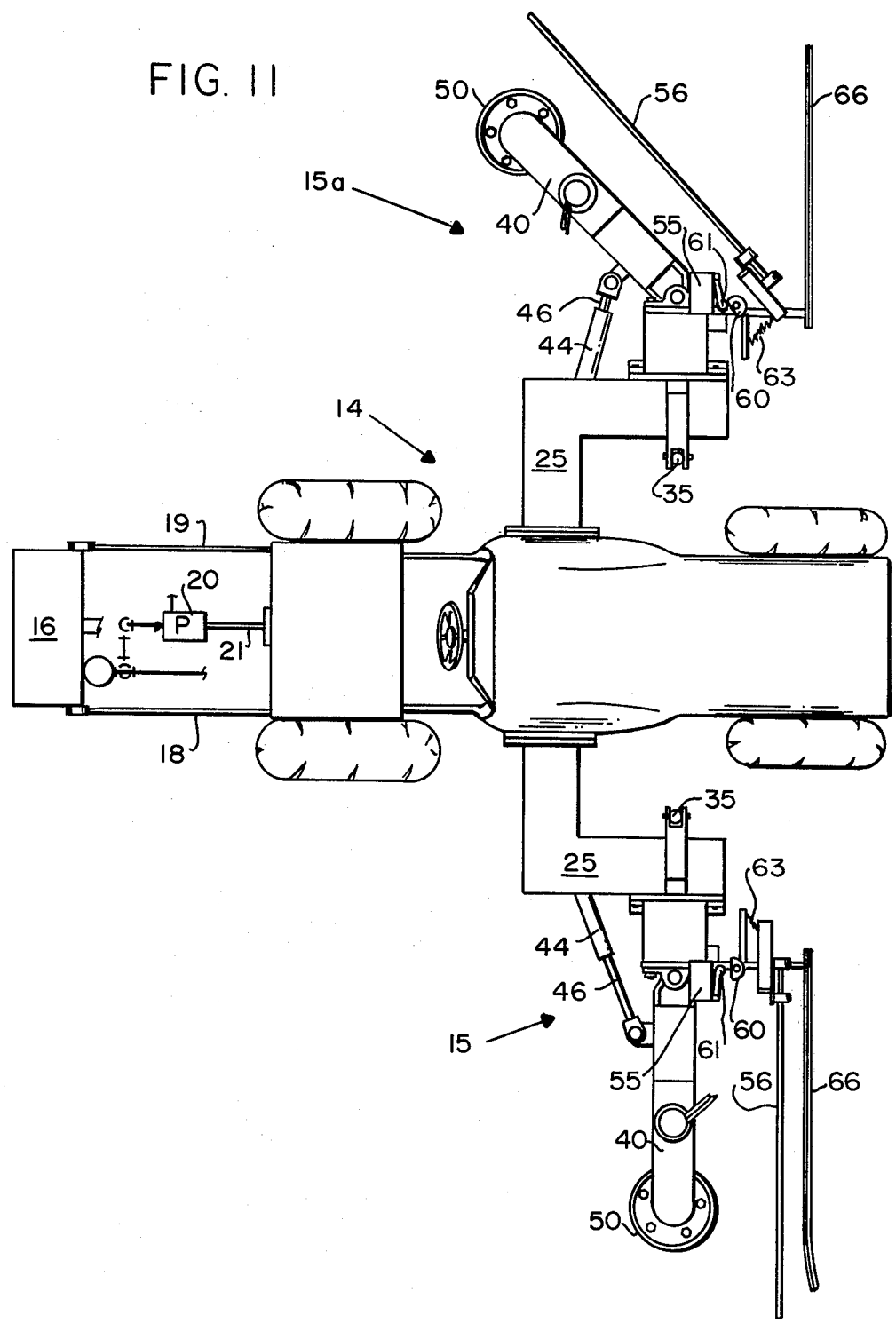
FIG. 11 is a plan view of a tractor like that of FIG. 2 with two tillers of this invention, one on each side of the tractor, one being shown in normal position, and one in retracted position.

It should be understood that the tiller 15 may be on either side of the tractor 14, or, as shown in FIG. 11, there may be two tillers 15 and 15a, one on each side of the the tractor 14, the tiller 15a being a mirror image of the tiller 15. The tillers 15 and 15a act independently of each other, as illustrated in FIG. 11, where one tiller 15 is in its normal position, and the tiller 15a is in its retracted position. It is also possible for one tiller to be mounted in a permanently retracted position requiring no sensor, the other tiller being sensor operated.

To those skilled in the art to which this invention relates, many changes in construction and widely differing embodiments and application of the invention will suggest themselves without departing from the spirit and scope of the invention. The disclosures and the descriptions herein are purely illustrative and are not intended to be in any sense limiting.

I claim:

1. An automatically retracting tiller for installation at one side of a tractor, including in combination:
    a stationary frame adapted to be secured to a side frame attachment of a tractor,
    a gimbal having a gimbal frame pivoted to said stationary frame by a stationary horizontal pivot rod and having first and second vertical pivot rods,
    first power means for tilting said gimbal frame about said horizontal pivot rod,
    a tiller frame pivoted to said first vertical pivot rod and carrying tilling apparatus,
    second power means for swinging said tiller frame about said first vertical pivot bar,
    control means for said second power means having a control lever,
    a cam mounted on said second vertical pivot rod in contact with said control lever for operation of said control means, and
    a sensor arm connected to said second vertical pivot rod extending horizontally out from said gimbal frame, so that when it engages a vine trunk, tree, fence post, or grapestake, it rotates said cam and thereby actuates said control means to energize said second power means to retract said tiller frame and thereby protect the vine trunk from said tilling apparatus.

2. The tiller of claim 1 having yieldable spring means urging said sensor arm to a position normal to the direction of movement of the tiller.

3. The tiller of claim 2 having a resilient bumper stop supported by said gimbal frame for engaging said sensor arm at the end of its spring return.

4. The tiller of claim 1 wherein said sensor is a fiberglass rod.

5. The tiller of claim 1 having a springy weed suppressor mounted to said gimbal frame parallel to the normal unretracted position of the sensor arm and preceeding it.

6. The tiller of claim 1 wherein said tiller apparatus comprises a rotary tilling head with dependent tines.

7. The tiller of claim 6 wherein said tines are set at 3° off vertical with the lower end trailing the upper end.

8. The tiller of claim 7 having at least five said tines.

9. An automatically retracting tiller for installation at one side of a tractor, including in combination:
   a stationary frame adapted to be secured to a side frame attachment of a tractor,
   a gimbal having a gimbal frame pivoted to said stationary frame by a stationary horizontal pivot rod and having first and second vertical pivot rods,
   a double-acting vertical hydraulic apparatus having a cylinder secured to said stationary frame and a piston rod secured to said gimbal frame, for tilting said gimbal frame about said horizontal pivot rod,
   a tiller frame pivoted to said first vertical pivot rod and carrying tilling apparatus,
   a double-acting horizontal hydraulic apparatus having a cylinder secured to said stationary frame and a piston rod secured to said tiller frame for swinging said tiller frame about said first vertical pivot bar,
   a control valve for said horizontal hydraulic apparatus mounted on said tiller frame and having a control lever,
   a cam mounted on said second vertical pivot rod in contact with said control lever for operation of said valve,
   a sensor arm connected to said second vertical pivot rod and extending out horizontally from said gimbal frame so that when it engages a vine trunk, tree trunk, fence post, or grapestake, it rotates said cam and actuates said valve to cause said horizontal hydraulic apparatus to retract said tiller frame and thereby protect the vine trunk from said tilling apparatus.

10. The tiller of claim 9 wherein said tilling apparatus comprises a tiller head mounted for rotation normally in a horizontal plane and having depending tines.

11. The tiller of claim 10 wherein there are at least five said tines set at 3° off vertical so that their lower end trails the upper end during rotation.

12. The tiller of claim 10 having hydraulic motor means for rotating said tiller head at a speed of about 150-300 r.p.m.

13. The tiller of claim 9 having yieldable spring means for urging said sensor to its usual position normal to the direction of travel of said tiller.

14. The tiller of claim 13 wherein said cam is shaped so that once it actuates the control lever, further movement of said sensor does not affect that actuation until said spring means restore said sensor to its usual position.

15. A tilling device, comprising
   a self powered retractor having at least one side frame attachment,
   a stationary frame secured to said side frame attachment,
   a gimbal having a gimbal frame pivoted to said stationary frame by a stationary horizontal pivot rod and having first and second vertical pivot rods,
   first power means for tilting said gimbal frame about said horizontal pivot rod,
   a tiller frame pivoted to said first vertical pivot rod and carrying tilling apparatus,
   second power means for swinging said tiller frame about said first vertical pivot bar,
   control means for said second power means having a control lever,
   a cam mounted on said second vertical pivot rod in contact with said control lever for operation of said control means, and
   a sensor arm connected to said second vertical pivot rod extending horizontally out from said gimbal frame, so that when it engages a vine trunk or grapestake, it rotates said cam and thereby actuates said control means to energize said second power means to retract said tiller frame and thereby protect the vine trunk from said tilling apparatus.

16. The tilling device of claim 15 having two said side-frame attachments, one of said attachments mountable on each side of a tractor and two said stationary frames, one secured to each said side frame attachment, each said side frame having an assembly comprising a said gimbal, first power means, tiller frame, second power means, control means, cam and sensor arm, each said assembly being independent of the other for separately actuated retraction.

17. The tiller of either claim 15 or 16 having yieldable spring means for each said sensor arm, urging its said sensor arm to a position normal to the direction of movement of the tiller.

18. The tiller of claim 17 having a resilient bumper stop supported by said gimbal frame for engaging said sensor arm at the end of its spring return.

19. The tiller of either claim 15 or 16 having a springy weed suppressor mounted to said gimbal frame parallel to the normal unretracted position of the sensor arm and preceeding it.

20. The tilling device of either claim 15 or 16 wherein said tiller apparatus comprises a rotary tilling head with at least five dependent tines.

21. The tilling device of claim 20 wherein said tines are set at 3° off vertical with the lower end trailing the upper end.

* * * * *